United States Patent Office 3,202,735
Patented Aug. 24, 1965

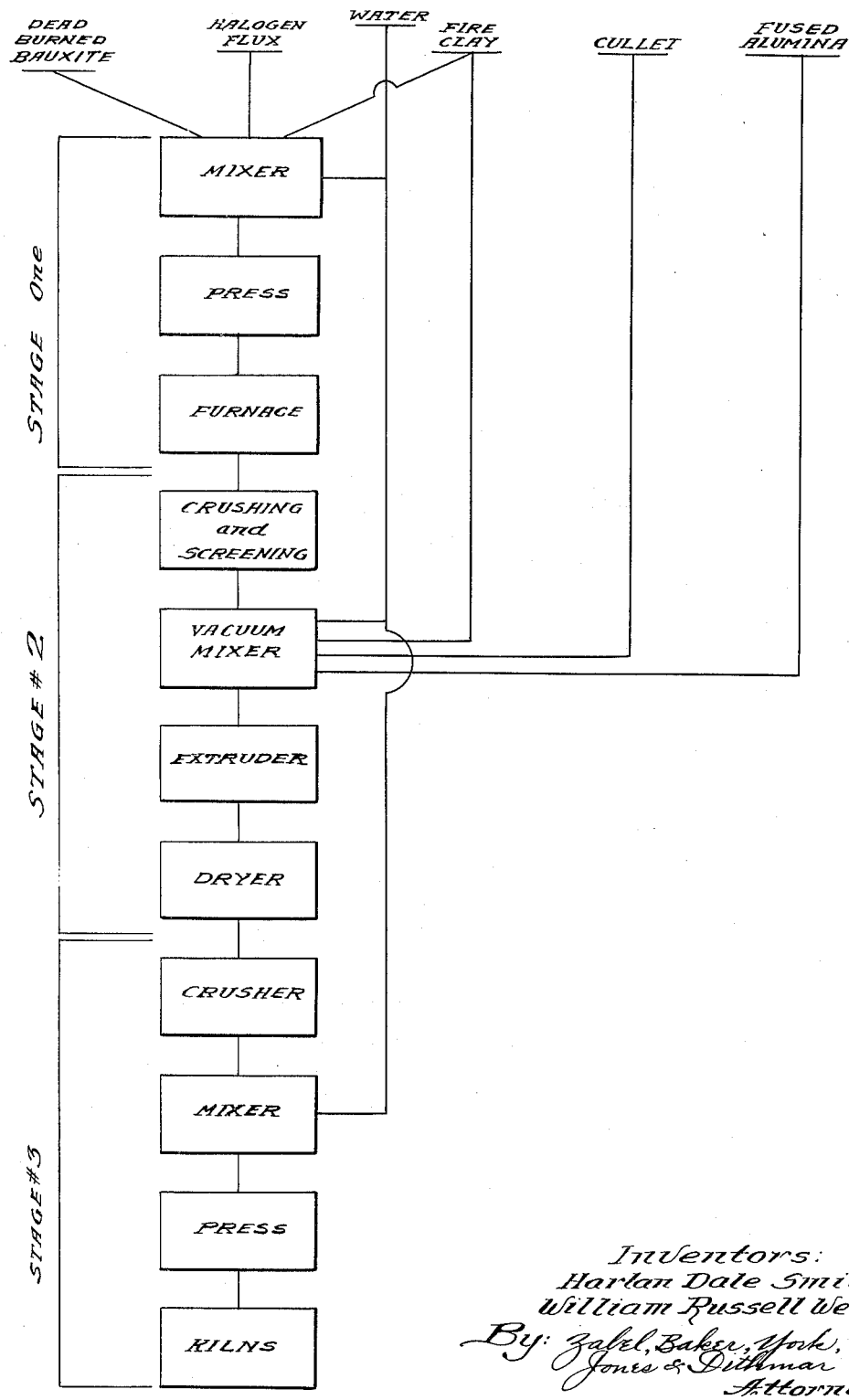

3,202,735
BAUXITE BRICK AND PROCESS OF MAKING THE SAME
Harlan Dale Smith and William Russell Weiss, Wellsville, Mo., assignors to Wellsville Fire Brick Company, Wellsville, Mo., a corporation of Missouri
Filed Jan. 2, 1962, Ser. No. 163,895
8 Claims. (Cl. 264—56)

The present invention relates to a stable refractory material, and more particularly to a novel high-alumina brick and the process for making said brick.

Conventional high-alumina refractory brick are manufactured in several grades which vary in alumina content from 50 to 90%, and consist of a dead burned bauxite grog bonded by a clay matrix. This matrix or bonding material constitutes the major portion of the surface area of the brick prior to burning.

The prior art on the manufacture of such brick includes combining of the proper grain sizes of a dead burned bauxite and suitable clays, and then power pressed to approximately 4000 p.s.i. using in the region of 7 to 8% moisture. These bricks are then fired to Cone 12 to 14 and are then available for commercial use. There are several drawbacks to the use of such brick in the field, one being a 4 to 6% expansion when heated to approximately 2910° F. Another drawback is a porosity of 22 to 28%, which high porosity results in premature failures of the brick in service because it allows both gas and slag penetration. Also, the bricks have poor spalling resistance.

Bauxite as it is usually found in nature is composed primarily of hydrated alumina or aluminum hydroxide, the amount of aluminum oxide ranging from 50 to 60%. This aluminum oxide is combined with relatively smaller amounts of iron oxide (¼% to 5%), silica (3% to 15%), titanium oxide (1½% to 5%) and the residue being combined water. Upon calcining or igniting, it is possible to remove this combined water with an ignition loss varying from 25 to 33%. The dead burned bauxites available from British Guiana or other sources, although high fired, are, as aggregates, extremely unstable with volume expansion and increasing porosity when put in service.

An important object of the present invention is to produce a stable high-alumina brick containing 60% or more aluminum oxide.

Another object of the present invention is the provision of a three-stage method of manufacture to provide a brick of greater stability, greater density and lower porosity than has been hitherto available in the refractory market.

A further object of the present invention is the provision of a halogen containing flux to stabilize the bauxite brick. To properly stabilize the bauxite, the following conditions must be met: high surface softening of the bauxite grains in the presence of a gaseous component capable of reacting with alumina silicate at high temperatures in the range of 2300 to 2800° F. The present invention is confined to the treatment of dead burned bauxite with the metal salts and compounds of the halogen group; namely, fluorine, chlorine, bromine and iodine. As the atomic weights of the halogens increase, the oxidizing power decreases so that fluorine or chlorine are preferred in the flux due to their higher oxidizing potential.

The present invention also provides for a reaction in the three-stage process to form a stable aggregate which appears to take no further reaction on reheating to 2910° F.

Further objects will become apparent to those skilled in the art upon consideration of the following description and as particularly defined by the accompanying claims.

The process of the invention in its broad aspect comprises the steps of crushing dead burned bauxite, mixing with clay and a flux, pressing the mixture and firing, crushing the fired product, adding more clay, and extruding and drying the mixture, crushing and grinding the extruded shapes, tempering and pressing the ground material to the final shape, and drying and firing the resulting brick.

The three stage process of the invention is shown in the accompanying drawing.

In accordance with the present invention, the first stage of the three-stage process involves the addition of halogen containing additives to dead burned bauxite, crushing and pressing. The second stage involves further crushing and mixing with further additives under a vacuum, and extruding dobie shapes which are then dried. The third stage involves additional crushing and grinding, addition of water and power pressing into the final forms which are then dried and fired.

The raw material utilized in the preparation of the high-alumina refractory brick is bauxite in a dead burned state such as available from British Guiana and other sources. The bauxite as mined contains ($Al_2O_3.2H_2O$) or ($Al_2O_3.H_2O$) plus 1 to 5% by weight iron oxides and 1 to 41% by weight silica as $SiO_2$ with the silica content generally in the range of 1 to 14%. These aggregates, although highly fired (approximately 3000° F.) prove to be extremely unstable with volume expansion and porosity when put into service.

In the first stage of the novel process, the dead burned bauxite is crushed to pass through a 6 mesh screen. Then approximately 1–5% by weight of a sodium halide for example, sodium chloride or aluminum wastes containing halides are added along with approximately 10 to 30% by weight of wet refractory clay

($Al_2O_3.2SiO_2.2H_2O$)

so that the mixture can be power pressed into suitable dobies. These dobies are then fired in a suitable tunnel kiln to a temperature of approximately 2300° F. to 2800° F., depending upon the types and percentages of additives used.

Due to the high migratory properties of the fluxes and the volatility characteristics of their gases, excessive scumming and fluxing reactions are found to occur on the surface of the brick. In fact, the surface appearance of these dobie bricks in the first stage of the process may be so undesirable that it is necessary to remove the scum and remake the bricks after the migrating chemicals have been combined with the aluminum silicates in the bauxite to form insoluble compounds.

By using the halide fluxes in a three-stage process, several reactions are obtained which cannot be successfully obtained in a single step process such as described in the prior art, even though the undesirable scumming occurs. First, sufficient fluxing is available during the first stage to attack and soften the surface of the grains of the crushed dead burned bauxite. The gaseous reaction of the flux material is confined in the dobie shape sufficiently to greatly reduce the viscosity of the softened surface of the bauxite grains. The softening and decrease in viscosity of the surface of the bauxite grains allows for a very rapid reaction of the alumina and silica to combine and form a stable mullite

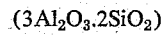
($3Al_2O_3.2SiO_2$)

which appears to take no further reaction on reheating to approximately 2910° F.

With these stabilized bauxitic grains in the dobie bricks, the further process to make a finished refractory brick may now proceed. The treatment of the bauxite with the flux in the first stage stabilizes it against expansion upon reheating to elevated temperatures. Although this stabilization occurs in the first stage, it is maintained throughout the balance of the process.

The second stage of the present invention involves the crushing of the dobie bricks to pass through an approximately 8 mesh screen. This crushed material is then mixed with fused or calcined alumina to control the alumina content of the bricks, a small percentage of cullet, approximately 3% by weight, which greatly improves the final bonding strength, a wetting agent, and sufficient wet refractory clay binder to provide an adhesive mass for an extrusion operation. This mixture is mixed under a vacuum of approximately 27 to 29 inches of mercury to secure intimate and complete coating of the bauxite particles with the clay bonding medium. It has been found that by coating the bauxite particles in this manner that the overall porosity of the final brick is reduced to approximately 14 to 16% rather than the commercially available brick which has a porosity of from approximately 22 to 28%. This mixture is then extruded into suitable dobie shapes and dried in a conventional dryer.

The third stage of the present invention involves the crushing of the extruded dobie shapes, grinding the crushed particles to a size which will pass through a 4 mesh screen. The particles are tempered with sufficient water for pressing and then the particles are power pressed at approximately 4000 p.s.i. to form the final refractory brick. This brick is then dried and fired to a temperature of approximately 2550° F. (Cone 14) in the customary manner.

A representative chemical analysis of the final refractory brick is shown in the following table:

Table I

| | Percent |
|---|---|
| Silica as $SiO_2$ | 18.8 |
| Alumina as $Al_2O_3$ | 75.4 |
| Iron as $Fe_2O_3$ | 2.0 |
| Titania as $TiO_2$ | 2.2 |
| Lime as CaO | 0.3 |
| Magnesia as MgO | 0.2 |
| Alkalis as $Na_2O+K_2O$ | 0.9 |

Several features of this final brick obtained from the three-stage process are believed to be of particular importance. The linear expansion upon reheating carried out according to ASTM test C–113, Schedule C showed a representative value of +0.5%. Further, as previously stated, the porosity of the brick is approximately 14%; this value determined under ASTM test C–20. Other important properties are the bulk density of the brick which is approximately 165 pounds per cubic foot with a modulus of rupture of 2600 p.s.i. and a cold crushing strength above 10,000 p.s.i.; values substantially higher than that of the presently available commercial bricks.

Thus, we have invented a novel three-stage process for the manufacture of refractory brick from available dead burned bauxite having a reduced porosity, a substantially lower expansion on reheating and an improved intimacy of the bond between the particles to give a substantially improved product. The lower porosity makes the brick much more resistant to deteriorating furnace conditions.

The mesh screen sizes as set forth in this specification refer to meshes per lineal inch for Tyler standard screen scale sieves.

While we have shown and described certain specific embodiments of our invention, we do not wish to be limited thereto since various modifications may be made without departing from the scope of the claims.

Having disclosed the invention, we claim:

1. A process for preparing a dimensionally stable bauxite refractory brick of high alumina content and low porosity, comprising in a first stage, subdividing dead burned bauxite so as to pass a 6 mesh screen of the Tyler standard screen scale, mixing with said bauxite a halide flux and wet refractory clay binder, forming the resulting mixture into shaped masses and firing the shaped masses to produce a material stable against expansion upon reheating; in a second stage subdividing said fired shaped masses so as to pass an 8 mesh screen of the Tyler standard screen scale, mixing the resulting particulate material under a vacuum with fused alumina, a minor amount of cullet and sufficient wet refractory clay binder to provide an extrudable mass in which the clay binder intimately and completely coats said particulate material, extruding said mass and drying the extruded material; and in a third stage, subdividing the extruded dried material so as to pass a 4 mesh screen of the Tyler standard screen scale, tempering the subdivided material with water, power pressing the tempered material into bricks of the desired shape and drying and firing the shaped bricks.

2. A process as claimed in claim 1 in which said halide flux is sodium fluoride present in an amount of 1 to 5% by weight.

3. A process as claimed in claim 1 in which said halide flux is sodium chloride present in an amount of 1 to 5% by weight.

4. A process as claimed in claim 1 in which the firing in the first stage is at a temperature between approximately 2300° F. to 2800° F. and the firing in the third stage is at a temperature of approximately 2550° F.

5. A process as claimed in claim 1 in which the mixing in the second stage is under a vacuum of approximately 27 to 29 inches of mercury.

6. A process as claimed in claim 1 in which the cullet is added in the second stage in an amount of approximately 3% by weight.

7. A process as claimed in claim 1 in which a wetting agent is also mixed with said particulate material in the second stage.

8. A process as claimed in claim 1 in which the power pressing in the third stage is at approximately 4,000 p.s.i.

References Cited by the Examiner

UNITED STATES PATENTS

| 134,124 | 12/72 | Blaisius | 264—56 |
|---|---|---|---|
| 185,277 | 12/76 | Anderson | 264—56 |
| 257,093 | 4/82 | Skinner | 50—464 |
| 271,088 | 1/83 | Lynch | 50—464 |
| 2,195,950 | 4/40 | Wood. | |
| 2,313,746 | 3/43 | Heany. | |
| 2,399,225 | 4/46 | Heany | 106—65 X |
| 2,635,950 | 4/53 | Robinson. | |
| 2,685,528 | 8/54 | Robinson | 106—65 |

FOREIGN PATENTS 294,179  10/29  Great Britain.

OTHER REFERENCES

Recent Developments in Refractories and Their Applications, Rochow, W. F. et al., Chemical Engineering Progress, 44(11): pages 869–872, November 1948.

ROBERT F. WHITE, *Primary Examiner.*

ALEXANDER H. BRODMERKEL, *Examiner.*